United States Patent Office 3,812,054
Patented May 21, 1974

3,812,054
DAYLIGHT FLUORESCENT PIGMENTS AND
PROCESS FOR PREPARING THEM
Siegfried Noetzel, Mainz, and Edgar Fischer, Frankfurt am Main, Germany, assignors to Farbwerke Hoechst Aktiengesellschaft vormals Meister Lucius & Bruning, Frankfurt am Main, Germany
No Drawing. Filed Jan. 20, 1972, Ser. No. 219,518
Claims priority, application Germany, Feb. 2, 1971, P 21 04 717.6
Int. Cl. C09k 1/02
U.S. Cl. 252—301.2 R  4 Claims

ABSTRACT OF THE DISCLOSURE

New daylight fluorescent pigments which contain an organic fluorescent dyestuff and a cross-linked, hydroxyl group containing polyester or a cross-linked copolymer of olefinically unsaturated compounds containing hydroxyl groups and of olefinically unsaturated compounds free from hydroxyl groups, and a process for their preparation which comprises incorporating the organic fluorescent dyestuff into the resin. These daylight fluorescent pigments may be employed for preparing fluorescent paints, for example air-drying lacquers on the basis of alkyd resin or physically drying lacquers on the basis of acrylic resins, as well as for preparing fluorescent printing inks such as inks for screen printing, intaglio printing, book printing and offset-litho printing. Due to their high resistance to heat, they are particularly suitable for fluorescent dyeing of plastics and enamels.

The present invention relates to new daylight fluorescent pigments on the basis of cross-linked polyesters or copolymers containing hydroxyl groups from olefinically unsaturated compounds containing hydroxyl groups and olefinically unsaturated compounds being free from hydroxyl groups. The invention also relates to a process for preparing these pigments.

As starting components for the polyesters containing hydroxyl groups, there are considered the following bi- and polyfunctional organic carboxylic acids and alcohols: saturated aliphatic, aromatic and cycloaliphatic carboxylic acids, such as adipic acid, phthalic acid, isophthalic acid, terephthalic acid, trimellitic acid and cyclohexane-dicarboxylic acid-(1,4) as well as saturated aliphatic, aromatic, cycloaliphatic and nitrogen-containing alcohols such as ethylene glycol, 1,2-propylene-glycol, 1,3-butylene-glycol, neopentyl glycol (2,2-dimethyl-propane-diol-1,3), butane-diol-1,4, hexane-diol-1,6, glycerol, trimethylol propane, trimethylol ethane, hexane-triol-1,2,6, pentaerythrite, the hexites, 1,4 - dihydroxy-methyl-benzene, 1,4 - dihydroxy-methyl-cyclohexane and diethanol amine. There may also be used unsaturated oligofunctional carboxylic acids and alcohols such as fumaric acid, maleic acid and butene-2-diol-1,4 in mixture with saturated oligofunctional carboxylic acids or alcohols.

The polyesters containing hydroxyl groups are prepared according to known processes by melt condensation in the presence of esterification or transesterification and polycondensation catalysts such as zinc acetate or manganese acetate and antimonium trioxide at temperatures of up to 250° C., if desired in vacuo, while distilling off water or the lower alcohols. The conditions for condensation, the type and the quantities of the acid and alcohol component used determine the properties of the final product; they have to be chosen in such a way that the condensation products are formed with a relatively low molecular weight.

There are considered especially very branched polyesters with hydroxyl numbers of from 200 to 600 and molecular weights of from 300 to 3000. They are obtained for example by condensation of a dicarboxylic acid ester such as terephthalic acid dimethyl ester with a triol such as trimethylol propane in the molar ratio of 1:2 to 1:0.5.

As examples for the olefinically unsaturated compounds free from hydroxyl groups, which may be copolymerized with the olefinically unsaturated compounds containing hydroxyl groups such as (meth)-acrylic acid-β-hydroxy-ethyl ester or (meth)-acrylic acid-β-hydroxy-propyl ester, there may be mentioned the following compounds: (meth)-acrylic acid-methyl, -ethyl, -propyl, -n-butyl, -t-butyl-ester, styrene, α-methylstyrene, acrylo-nitrile, vinyl chloride, vinyl acetate, vinyl propionate and vinyl butyrate.

The copolymers containing hydroxyl groups of the α,β-unsaturated CC— compounds are prepared by solvent polymerization in solvents such as aromatic hydrocarbons, ketones, esters or ethers, which do not contain active hydrogen, with catalysts, as for example dibenzoyl peroxide, di-tert-butyl-peroxide or azoisobutyronitrile, if desired in the presence of regulators of the molecular weight such as aliphatic mercaptans. It has turned out to be suitable to realize the polymerization process in the following way: the monomeric mixture which contains the peroxide catalyst and, if desired, the compound regulating the molecular weight, is added as a dosage during all the polymerization time. By this way, copolymers having molecular weights of from about 10,000 to 80,000 are obtained, which are particularly advantageous as starting components for preparing the polyurethane resins. The quantity of the hydroxyl compound incorporated into the copolymer depends on the quantity and the functionality of the crosslinking substance; it should preferably amount to 10–50% by weight of the total weight of the copolymer.

In the preparation of the polyesters containing hydroxyl groups as well as of the copolymers containing hydroxyl groups the type and the quantity of the starting components used may vary within wide limits. However, it is not difficult for the expert, to choose such starting components in such mixture ratios as to permit that the support resins obtained have the properties necessary for the daylight pigments.

As cross-linking substances for the polyesters and copolymers containing hydroxyl groups, there may be used di- and tetracarboxylic acid anhydrides.

As cyclic di- and tetracarboxylic acid anhydrides there are considered phthalic acid anhydride, cis-hexahydro-phthalic acid anhydride, Diels-Alder aducts of maleic acid anhydride to butadiene and cyclopentadiene, chlorinated phthalic acid anhydride, hexachlorendomethylene-tetrahydrophthalic acid anhydride (HET-acid anhydride), trimellitic acid anhydride, promellitic acid dianhydride, 1,2,3,4-butane-tetracarboxylic acid dianhydride and 1,2,3,4-cyclopentane-tetracarboxylic acid dianhydride and higher-molecular cyclic anhydrides, which are formed by copolymerization of maleic acid, itaconic acid or tetrahydrophthalic acid anhydride with styrene, vinyl ethers and/or (meth)acrylates, the anhydride portion in the copolymer amounting to 20–60 moles-percent.

For preparing the support resins, the polyesters and copolymers containing hydroxyl groups are mixed in solvents containing no active hydrogen such as monoalkyl glycol esters, dimethyl formamide, dimethyl sulfoxide, dioxane with the cyclic carboxylic acid anhydrides at room temperature or elevated temperature and cross-linked at 120°–200° C. at normal pressure or in vacuo for some hours, under elimination of the solution. It is expedient to add to an alkylglycol-acetate solution, which contains 40–60% by weight of the polyhydroxyl compound, the cross-linking substance while stirring well at temperatures of from 50° to 120° C. The quantity of the cross-linking substance added depends on the functionality of the cross-linking substance and on the desired degree of hardness and brittleness of the support resin formed. In general, the polyhydroxyl compound and the cross-linking substance are used in an equivalent ratio, i.e. one hydroxy group corresponds to half of an anhydride group. Of course, the cross-linking substance concerned may be used in amounts of up to a half equivalent more or less than the hydroxyl compound, whereby cross-linking products having a small or high degree of hardness are obtained.

In the polyhydroxyl anhydride cross-linking, there may also be condensed, if desired, up to 30% of epoxide resin, i.e. reaction products of bisphenol A and epichlorohydrin having at least two epoxide groups. The support resins thus obtained are characterized by a good transparency and clearness and a sufficient resistance to organic solvents, oxygen and humidity. Furthermore they have a better resistance to heat and a better fastness to light than the resins which are known from U.S. Patent Specifications Nos. 2,498,592, 2,809,954, 2,938,873, 3,116,256 and 3,412,036, the British Patent Specifications Nos. 734,181, 748,484, 792,616 and 1,048,983 and the German Patent Specification No. 961,575. These properties make the resins according to the invention particularly suitable for being used in daylight fluorescent pigments. These pigments consist of a colorless, finely ground support resin, into which a fluorescent dyestuff has been incorporated. Such daylight fluorescent pigments are used more and more in the lacquer, printing ink and plastics industry as well as in the field of textiles and for coating paper.

As fluorescent dyestuffs there are considered organic compounds which are fluorescent at daylight in dissolved or solid, crystalline form, as for example fluorescent dyestuffs of the rhodamine, sulforhodamine or naphthalimide series. There may also be employed the dyestuffs described in French Patent Specifications Nos. 1,590,506, 1,444,489, 1,488,113 and 1,470,793.

For preparing the fluorescent daylight pigments according to the invention, the fluorescent dyestuffs are incorporated into the support resins by dissolving or dispensing them in the solution which contains the mixture of the polyhydroxyl compound and the cross-linking substance, whereupon the mixture is cured in the manner described above. However, the fluorescent dyestuffs may already be dissolved or dispersed in the solution which contains the polyhydroxyl compound, or they are employed in a form chemically bound to the cross-linking substances.

The cured product thus obtained is then converted into a finely divided form by dry or wet grinding in a ball or perl mill. Grinding is expediently carried out in the presence of water. The particle size of the daylight fluorescent pigment, which may vary within wide limits, depends to a large extent on the desired field of application. Thus, the average particle size of the daylight fluorescent pigment generally ranges between about 5 and 30$\mu$, if it is to be used for silk screen printing or for preparing lacquers, and between about 0.1 and 5$\mu$, if printing inks are to be prepared.

The concentration of the dyestuff in the resin depends above all on the type of the resin, on the dyestuff used and on the desired application of the daylight fluorescent pigment. The dyestuff concentration generally ranges between about 0.1 and 10 percent by weight. The daylight fluorescent pigment preferably contains the dyestuff in a concentration which provides the best possible brilliancy, the tinctorial strength of the product dyed with this dyestuff being good.

The daylight fluorescent pigments prepared by using the condensation resins according to the invention may be employed for preparing fluorescent paints, for example, air-drying lacquers on the basis of alkyd resins or physically drying lacquers on the basis of acrylic resins, as well as for preparing fluorescent printing inks such as inks for screen printing, intaglio printing, book printing and offset-litho printing. Due to their high resistance to heat, they are especially suitable for fluorescent dyeing and offset-litho printing. Due to their high resistance between 200° and 300° C., and of enamels which are stoved above 150° C.

The following Examples illustrate the invention. Parts and percentages are by weight unless stated otherwise.

EXAMPLE 1

200 g. of ethyl glycol acetate were heated to 140° C. and at this temperature a mixture of 120 g. of methyl methyacrylate, 80 g. of hydroxy ethyl methacrylate, 2.4 g. of di-tert-butyl peroxide and 4.8 g. of tert-dodecyl mercaptan was added in the course of 5 hours, and polymerization was continued for one hour. The reaction mixture had then reached a content of solids of 48.1%. 23 parts each of this acrylate resin solution were mixed at 100° C. with 2.3 parts of phthalic acid anhydride and cured at 150° C. under greatly reduced pressure during 15 hours. The transparent, brittle cured products obtained were ground to a fine powder. They decomposed at 310–350° C. and were unsoluble in xylene, ethanol, butanol, butyl acetate and acetone.

23 parts of the above acrylate resin solution, 2.3 parts of phthalic acid anhydride and 0.15 part of 10-methoxy-benzoxanthene-3,4-dicarboxylic acid hydrazide were mixed at about 100° C. while stirring well and cured at 150° C. under greatly reduced pressure during 15 hours. A product of intense green-yellow fluorescence was obtained, which was ground to a fine powder in the ball or vibratory mill. It decomposed at 310–350° C. and was unsoluble in xylene, ethanol, butanol, butyl acetate and acetone.

Comparable products were obtained if, instead of phthalic acid anhydride, 2.4 parts of tetrahydrophthalic acid anhydride or 1.0 part of succinic acid anhydride were used.

EXAMPLE 2

200 g. of ethyl glycol acetate were heated to 140° C., and a mixture of 120 g. of n-butyl methacrylate, 80 g. of $\beta$-hydroxypropyl methacrylate, 2.4 g. of di-tert-butyl peroxide and 4.8 g. of tert.-dodecyl mercaptan was added in the course of 5 hours, and then polymerization was continued for two hours. The content of solids of the reaction mixture had then reached the value of 45.6%. 23 parts each of this acrylate resin solution were mixed at about 100° C. with 2.26 parts of phthalic acid anhydride and cured at 150° C. under greatly reduced pressure during 15 hours. The transparent, brittle cured products obtained were ground to a fine powder. They decomposed at 290–330° C. and were unsoluble in xylene, ethanol, butanol, butyl acetate and acetone.

If a mixture of 23 parts of the above acrylate resin solution, 2.26 parts of phthalic acid anhydride and 0.15 part of 10-methoxy-benzoxanthene-3,4-dicarboxylic acid hydrazide were cured at 150° C. under greatly reduced pressure during 15 hours, a product of an intense green-yellow fluorescence was obtained, which was ground to a fine powder in a ball mill. It decomposed at 290–330° C. and was unsoluble in xylene, ethanol, butanol, butyl acetate and acetone.

Instead of 10-methoxy-benzoxanthene-3,4-dicarboxylic acid hydrazide, the following fluorescent dyestuffs may be employed (their fluorescent shades are indicated):

benzoxanthene-3,4-dicarboxylic acid imide (green),
benzoxanthene-3,4-dicarboxylic acid-N-3'-sulfonamido-phenyl imide (green),
benzo-thioxanthene-3,4-dicarboxylic acid stearylic imide (greenish-yellow),
benzo-thioxanthene-3,4-dicarboxylic acid hydrazide (greenish-yellow),
4-amino-1,8-naphthal-2',4'-dimethyl-phenyl imide (green) or
7-oxo-14-thia-dibenzo(b,d,e,f)-chrysene (orange-yellow).

4 parts of the daylight fluorescent pigment obtained according to the above Example were mixed for 5 minutes at 160° C. with 96 parts of a pulverized polyinyl chloride, which contained 3% of an organic tin stabilizer and 1% of oxystearic acid, on a two roller mixer. The resulting coat was stripped off and compression-molded for 5 minutes at 170° C. The pressed sheet obtained had an intense green-yellow fluorescence.

EXAMPLE 3

A mixture of 120 g. of methyl methacrylate, 160 g. of β-hydroxypropyl methacrylate, 120 g. of styrene, 4.8 g. of di-tert-butyl peroxide and 9.6 g. of tert.-dodecyl mercaptan were added in the course of 5 hours to 400 g. of ethyl glycol acetate heated to 140° C., and polymerization was continued for 2 hours at 140° C. The content of solids of the reaction mixture had reached the value of 50.9%. 23 parts each of the acrylate resin solution were mixed at about 100° C. with 2.26 parts of phthalic acid anhydride, and cured at 150° C. under greatly reduced pressure in 15 hours. The transparent, brittle cured products obtained could be ground to a fine powder; they decomposed at 290–340° C. and were unsoluble in xylene, ethanol, butanol, butyl acetate and acetone.

A mixture consisting of 23 parts of the above acrylate resin solution, 2.26 parts of phthalic acid anhydride and 0.18 part of benzoxanthene-3,4-dicarboxylic acid-hydroxy-ethyl imide was cured at 150° C. under greatly reduced pressure during 15 hours. A cured product of an intense green-yellow fluorescence was obtained, which was ground in a ball mill to give a daylight fluorescent pigment. It decomposed at 190–340° C. and was unsoluble in xylene, ethanol, butanol, butyl acetate and acetone.

For preparing an enamel, 20 parts of the daylight fluorescent pigment obtained according to the above Example were ground for 20 minutes on the paint-shaker together with 45 parts of xylene, 25 parts of a 60% solution of a short-oil, non-drying alkyd resin from 37% of oil (triglyceride) and 40% of phthalic acid anhydride in xylene and with 10 parts of a 50% solution of a non-plasticized melamine resin in alcohols and aromatic hydrocarbons in the presence of quartzite perls (2–3 mm. ϕ) in a 200 ml. plastic beaker. The lacquer obtained was sprayed on white-coated test plates (30 x 30 cm.) and stoved for 20 minutes at 160° C. The resulting lacquer had an intense green-yellow fluorescence.

EXAMPLE 4

In a 1 l. round flask provided with a stirrer, a Claisen connector, a Liebig cooler and a graduated receiver, 388 g. of terephthalic acid dimethyl ester, 402 g. of 1,1,1-trimethylol propane and 0.116 g. of manganese-II-acetate were heated under a nitrogen atmosphere in about half an hour in the oil-bath to an oil-bath temperature of 150° C. The mass was melted. The temperature was then increased while stirring to 250° C. in 5 hours. During this time, 120 g. of methanol, corresponding to 94% of the theoretical amount were distilled off. The solidified product was only slightly viscous, dissolved in xylene/butanol (50/50 parts by volume) in the heat and had an OH number of from 408 to 409.

20 parts of phthalic acid anhydride were dissolved at about 100° C. in 80 parts of a 50% solution of the above polyester resin in xylene/butanol (1:1), and cured at 150° C. in vacuo during 17 hours. The transparent cured products obtained were brittle and plasticized at 130° C. They were unsoluble in heptane, xylene, ethanol and butanol.

If 80 parts of the above polyester resin solution having a 50% concentration in xylene/butanol (1:1) were stirred with 20 parts of phthalic acid anhydride and 0.25 part of benzoxanthene-3,4-dicarboxylic acid hydroxy-ethyl imide, stirred at about 100° C. and cured at 150° C. in vacuo during 17 hours, cured products of an intense green-yellow fluorescence were obtained which began to plasticize at 130° C. They were unsoluble in heptane, xylene, ethanol and butanol and could easily be ground to give daylight fluorescent pigments.

Instead of benzoxanthene-3,4-dicarboxylic acid hydroxy-ethyl imide, there may also be employed the fluorescent dyestuffs mentioned in Example 6, passage 3.

EXAMPLE 5

A mixture of 120 g. of methyl methacrylate, 120 g. of vinyl acetate, 160 g. of β-hydroxy-ethyl-methacrylate, 4.8 g. of azoisobutyronitrile and 9.6 g. of tert.-dodecyl mercaptan were added to 400 g. of ethyl glycol acetate heated to 70° C., and polymerization was continued for 2 hours at 70° C. The reaction mixture had then reached a content of solids of 51%. 23 parts of this resin solution were mixed at about 100° C. with 2.3 parts of phthalic acid anhydride and cured at 150° C. in vacuo during 15 hours. The transparent, brittle cured products were ground in a ball mill to give a fine powder. They decomposed at about 250° C. and were unsoluble in heptane, xylene and ethanol.

With the aid of this product, a daylight fluorescent pigment could be prepared in the same way as indicated in Example 5.

We claim:
1. A daylight fluorescent pigment composition consisting of an organic fluorescent dyestuff and a resin, said resin being a hydroxyl-containing polyester condensation product of a bi-functional or polyfunctional organic carboxylic acid from the group adipic, phthalic, isophthalic, terephthalic, trimellitic and cyclohexane-dicarboxylic acid-(1,4) and a mixture thereof with fumaric or maleic acid with a bi-functional or polyfunctional organic alcohol from the group ethylene glycol, 1,2-propylene glycol, 1,3-butylene glycol, 2,2-dimethyl-propane-diol-1,3, butane-diol-1,4, hexane-diol-1,6, glycerol, trimethylolpropane, trimethylolethane, hexane-triol-1,2,6, pentaerythrite, hexite, 1,4-dihydroxy-methylbenzene, 1,4-dihydroxy-methyl-cyclohexane, diethanol amine and a mixture thereof with butene-2-diol-1,4, or being a hydroxyl-containing copolymer condensation product of an olefinically unsaturated hydroxyl-containing compound from the group methacrylic acid-β-hydroxyethyl ester and methacrylic acid-β-hydroxypropyl ester with a hydroxyl-free olefinically unsaturated compound from the group methacrylic acid methyl, ethyl, propyl, n-butyl or t-butyl ester, styrene, α-methyl-styrene, acrylonitrile, vinyl chloride, vinyl acetate, vinyl propionate and vinyl butyrate, said polyester or said copolymer being cross-linked with a dicarboxylic acid anhydride or a tetracarboxylic acid anhydride from the group phthalic acid anhydride, cis-hexahydrophthalic acid anhydride, Diels-Alder adduct of maleic acid anhydride to butadiene or cyclopentadiene, chlorinated phthalic acid anhydride, hexachlorendomethylene - tetrahydrophthalic acid anhydride, trimellitic acid anhydride, promellitic acid dianhydride, 1,2,3,4-butane tetracarboxylic acid dianhydride, 1,2,3,4-cyclopentane tetracarboxylic acid dianhydride and a cyclic anhydride copolymerization product of maleic acid anhydride, itaconic acid anhydride or tetrahydrophthalic acid anhydride with styrene, vinyl ether, methacrylate or a mixture thereof, the anhydride of said product being about 20 to 60 molar percent.

2. A composition according to claim 1 wherein said composition contains about 0.1% to about 10% of said dyestuff.

3. A composition according to claim 1 wherein said dyestuff is of the rhodamine, sulforhodamine or naphthalimide series.

4. A composition according to claim 1 wherein said polyester has a hydroxyl number of about 200 to 600, a molecular weight of about 300 to 3000 and the molar proportion of said acid to said alcohol is about 0.5:1 to 2:1, and said copolymer has a molecular weight of about 10,000 to 80,000 and contains about 10% to 50% by weight of said hydroxyl-containing compound.

References Cited

UNITED STATES PATENTS

| | | | |
|---|---|---|---|
| 2,796,413 | 6/1957 | Baer | 260—75 TN |
| 2,828,278 | 3/1958 | Kosmin | 260—75 TN |
| 2,938,873 | 5/1960 | Kazenas | 252—301.3 R |
| 3,028,370 | 4/1962 | Wheelock | 260—78.4 R |
| 3,412,036 | 11/1968 | Mcintosh | 260—856 |
| 3,499,058 | 3/1970 | Kaufman | 260—78.4 R |
| 3,535,287 | 10/1970 | Wynstra | 260—75 TN |
| 3,553,157 | 1/1971 | Dijkstra et al. | 260—75 TN |

DANIEL E. WYMAN, Primary Examiner

A. P. DEMERS, Assistant Examiner

U.S. Cl. X.R.

106—288 Q; 252—301.3 R; 260—39, 41, 75 TN, 77.5 R, 78.4, 78.5.